United States Patent
Cheong et al.

(10) Patent No.: US 10,091,794 B2
(45) Date of Patent: Oct. 2, 2018

(54) INFERENCE ALIGNMENT (IA) METHOD FOR UPLINK IN WIRELESS LOCAL AREA NETWORK (WLAN) SYSTEM, ACCESS POINT (AP) AND USER TERMINAL FOR PERFORMING THE SAME

(71) Applicant: ELECTRONICS AND TELECOMMUNICATIONS RESEARCH INSTITUTE, Daejeon (KR)

(72) Inventors: Min Ho Cheong, Daejeon (KR); Hyoung Jin Kwon, Sejong (KR); Sok Kyu Lee, Daejeon (KR); Jae Seung Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 117 days.

(21) Appl. No.: 15/131,860

(22) Filed: Apr. 18, 2016

(65) Prior Publication Data
US 2016/0309483 A1 Oct. 20, 2016

(30) Foreign Application Priority Data
Apr. 20, 2015 (KR) ........................ 10-2015-0055370

(51) Int. Cl.
*H04W 72/08* (2009.01)
*H04W 72/04* (2009.01)
*H04W 4/06* (2009.01)
*H04L 5/00* (2006.01)

(52) U.S. Cl.
CPC ........... *H04W 72/082* (2013.01); *H04L 5/006* (2013.01); *H04W 4/06* (2013.01); *H04W 72/0413* (2013.01)

(58) Field of Classification Search
CPC . H04W 72/082; H04W 4/06; H04W 72/0413; H04L 5/006
See application file for complete search history.

(56) References Cited

U.S. PATENT DOCUMENTS

| | | | |
|---|---|---|---|
| 2007/0207730 A1* | 9/2007 | Nguyen | H01Q 1/246 455/39 |
| 2011/0069628 A1* | 3/2011 | Liu | H04W 74/0816 370/252 |
| 2012/0281778 A1* | 11/2012 | Ruan | H04B 7/0456 375/267 |
| 2013/0088983 A1* | 4/2013 | Pragada | H04W 16/14 370/252 |
| 2013/0237261 A1* | 9/2013 | Bazzi | H04L 25/03343 455/501 |
| 2013/0267266 A1 | 10/2013 | Park et al. | |
| 2013/0301746 A1* | 11/2013 | Mobasher | H04B 7/0456 375/267 |
| 2017/0188388 A1* | 6/2017 | Nakajima | H04W 74/0816 |

\* cited by examiner

*Primary Examiner* — Walter J Divito

(57) ABSTRACT

An interference alignment (AI) method for an uplink in a wireless local area network (WLAN) system, an access point (AP) and a user terminal for performing the same, and the AP that may select an interference space, broadcast information on the selected interference space, select a user terminal to be assigned a data transmission opportunity based on leakage of interference (LIF) information received from at least one user terminal, receive data from the user terminal, and decode the data using a minimum square error (MMSE) based receiving filter.

18 Claims, 6 Drawing Sheets

INFERENCE ALIGNMENT (IA) METHOD FOR UPLINK IN WIRELESS LOCAL AREA NETWORK (WLAN) SYSTEM, ACCESS POINT (AP) AND USER TERMINAL FOR PERFORMING THE SAME

CROSS-REFERENCE TO RELATED APPLICATION

This application claims the priority benefit of Korean Patent Application No. 10-2015-0055370, filed on Apr. 20, 2015, in the Korean Intellectual Property Office, the disclosure of which is incorporated herein by reference.

BACKGROUND

1. Field of the Invention

Embodiments relate to an interference alignment (AI) method for an uplink in a wireless local area network (WLAN) system, an access point (AP) and a user terminal for performing the same.

2. Description of the Related Art

A near field communication network, for example, a local area network (LAN) is generally classified into a wired LAN and a wireless LAN (WLAN). In the WLAN, communication may be performed on a network using radio wave in lieu of using cable. The WLAN has been proposed as an alternative for outperforming difficulties in maintenance and repair, movement, and installation of cabling. Due to an increase in mobile device users, the need for the WLAN is also increasing.

A WLAN system includes an access point (AP), and a user terminal. The user terminal may also be referred to as a station (STA). The AP is a device for transmitting a radio wave in order that the user terminals are available to use network or access Internet within a service range. The WLAN system uses an IEE 802.11 standard released by an institute of electrical and electronics engineers (IEEE).

A basic constituent block of an IEEE 802.11 network is a basic service set (BSS). In the IEEE 802.11 network, there is an extended service set that extends a service area by connecting an independent network, for example, an independent BSS, to an infrastructure network, for example, an infrastructure BSS. In the independent network, terminals within the BSS may perform direct communication with each other. In the infrastructure network, an AP may be involved in communication performed between a terminal and another terminal existing inside or outside the BSS.

In general, an IEEE 802.11 based WLAN system may access a medium based on a carrier sense multiple access/collision avoidance (CSMA/CA) scheme, and each AP may operate independently. Thus, in the WLAN system, the AP may independently select a channel using an operator or a channel allocation algorithm. Due to this, a communication channel used by each BSS may overlap when many WLAN systems are provided. When the communication channel overlaps, interference may occur among adjacent BSSs thereby reducing network performance. Therefore, a communication method of effectively reducing the interference occurring in the WLAN system is needed.

SUMMARY

According to an aspect, there is provided an interference alignment (IA) method performed by an access point (AP), the method including selecting an interference space, broadcasting information on the selected interference space, selecting a user terminal to be assigned a data transmission opportunity based on leakage of interference (LIF) information received from at least one user terminal, receiving data from the selected user terminal, and decoding the data using a minimum mean square error (MMSE) based receiving filter.

The MMSE based receiving filter may include a first filter to reduce noise and interference included in the data and a second filter to increase a signal transmission gain.

The decoding of the data may include determining the MMSE based receiving filter based on a wireless local area network (WLAN) frame in which pilots for measuring interference among different basic service sets (BSSs) are added.

The pilots added to the WLAN frame may be independently used among the BSSs.

The selecting of the interference space may include determining a transmission vector to be transmitted to the user terminal based on a channel between the AP and the at least one user terminal.

The determining of the transmission vector may include determining the transmission vector based on a signal-to-noise ratio (SNR) of a signal received from the at least one user terminal.

The determining of the transmission vector may include calculating a Lagrangian multiplier, and calculating a null vector based on a Lagrangian function.

The selecting of the user terminal may include selecting a user terminal having a lowest LIF level as the user terminal to be assigned the data transmission opportunity.

The IA method performed by the AP may further include broadcasting information on a user terminal selected for each subchannel when user terminals are selected for all subchannels.

According to another aspect, there is provided IA method performed by a user terminal, the method including determining an LIF based on information on interference space received from an AP, transmitting information on the determined LIF to the AP, and transmitting data to the AP when the AP assigns a data transmission opportunity, wherein the AP may decode the data received from the user terminal using an MMSE based receiving filter.

The MMSE based receiving filter may include a first filter to reduce noise and interference included in the data and a second filter to increase a signal transmission gain.

The AP may determine the MMSE-based receiving filter based on a WLAN frame in which pilots for measuring interference among different BSSs are added.

The IA method performed by the user terminal may further include setting a waiting time to transmit a request to send (RTS) message based on the determined LIF, and transmitting the RTS message to the AP when feedback information is not received from another user terminal within a service range of the AP during the waiting time.

The setting of the waiting time may include setting the waiting time to be proportional to an LIF level.

The IA method performed by the user terminal may further include resetting the waiting time to infinity when an RTS message is received from the other user terminal during the waiting time.

The IA method performed by the user terminal may further include resetting the waiting time to infinity when a message, indicating that the AP received an RTS message from at least one user terminal, is received from the AP during the waiting time.

The RTS message may include information on an LIF level for each subchannel.

According to still another aspect, there is provided an AP including a transmission vector determiner configured to determine a transmission vector based on a channel between the AP and at least one user terminal, a user terminal selector configured to select a user terminal to be assigned a data transmission opportunity based on LIF information received from the at least one user terminal, a communicator configured to receive data from the selected user terminal, and a decoder configured to decode the data using an MMSE based receiving filter.

The MMSE based receiving filter may include a first filter to reduce noise and interference included in the data and a second filter to increase a signal transmission gain.

The decoder may be configured to determine the MMSE based receiving filter based on a WLAN frame in which pilots for measuring interference among different BSSs are added.

The user terminal selector may be configured to select a user terminal having a lowest LIF level as the user terminal to be assigned the data transmission opportunity.

According to yet another aspect, there is provided an AP including a transmission vector determiner configured to determine a transmission vector based on a channel between the AP and at least one user terminal, a user terminal selector configured to select a user terminal to be assigned a data transmission opportunity, a communicator configured to receive data from the selected user terminal, and a decoder configured to decode the data using an MMSE based receiving filter, wherein the MMSE based receiving filter may include a first filter to reduce noise and interference included in the data and a second filter to increase a signal transmission gain.

According to further aspect, there is also provided a user terminal including an LIF determiner configured to determine an LIF based on information on an interference space received from an AP and a communicator configured to transmit information on the determined LIF to the AP and transmit data to the AP when the AP assigns a data transmission opportunity, wherein the AP may decode the data received from the user terminal using an MMSE based receiving filter.

The MMSE based receiving filter may include a first filter to reduce noise and interference included in the data and a second filter to increase a signal transmission gain. The AP may determine the MMSE-based receiving filter based on a WLAN frame in which pilots for measuring interference among different BSSs are added.

The user terminal may further include a waiting time setter configured to set a waiting time to transmit an RTS message based on the determined LIF.

The communicator may transmit the RTS message to the AP when feedback information is not received from another user terminal within a service range of the AP during the waiting time.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
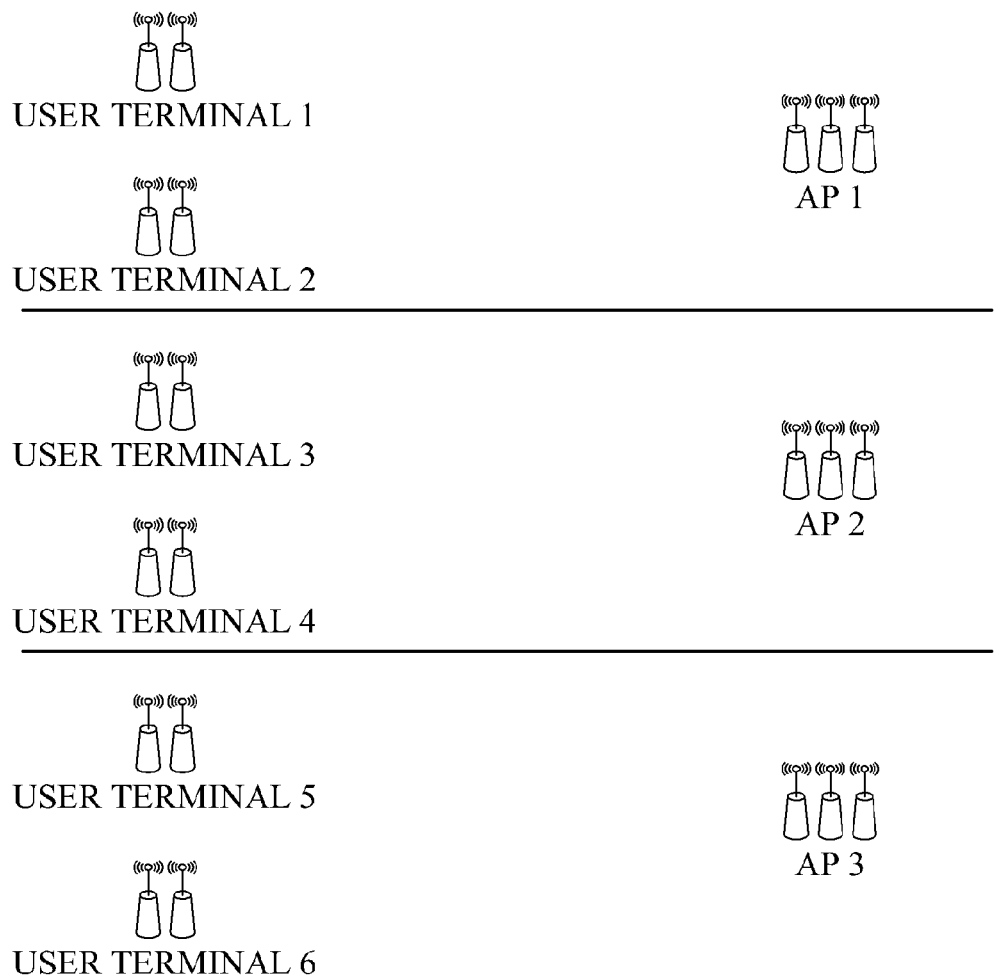
FIG. 1 is a diagram illustrating an interference environment of a wireless local area network (WLAN) system according to an embodiment.

Reference will now be made in detail to embodiments of the present invention, examples of which are illustrated in the accompanying drawings, wherein like reference numerals refer to the like elements throughout. Embodiments are described below to explain the present invention by referring to the figures.

Hereinafter, embodiments of the present invention will be described with reference to the accompanying drawings. The detailed description to be disclosed in the following with the accompanying drawings is provided to describe the embodiments and is not to describe a sole embodiment capable of implementing the present invention. The following description may include specific details to provide the full understanding of the present invention. However, it will be apparent to a person of ordinary skill that the present invention may be carried out even without the specific details.

The following embodiments may be provided in a form in which constituent elements and features of the present invention are combined. Each constituent element or feature may be construed to be selective unless explicitly defined. Each constituent element or feature may be implemented without being combined with another constituent element or feature. Also, the embodiments may be configured by combining a portion of constituent elements and/or features. Orders of operations described in the embodiments may be changed. A partial configuration or feature of a predetermined embodiment may be included in another embodiment, and may also be changed with a configuration or a feature corresponding to the other embodiment.

Predetermined terminologies used in the following description are provided to help the understanding of the present invention and thus, use of predetermined terminology may be changed with another form without departing from the technical spirit of the present invention.

In some cases, a known structure and device may be omitted or may be provided as a block diagram based on a key function of each structure and device in order to prevent the concept of the present invention from being ambiguous. In addition, like reference numerals refer to like constituent elements throughout the present specification.

The embodiments may be supported by standard documents disclosed in at least one of wireless access systems, for example, an Institute of Electrical and Electronic Engineers (IEEE) 802 system, a Third Generation Partnership Project (3GPP) system, a 3GPP Long Term Evolution (LTE) and LTE-Advanced (LTE-A) system, and a 3GPP2 system. That is, operations or portions not described to clearly disclose the technical spirit of the present invention among the embodiments may be supported by the standard documents. Further, all the terminologies used herein may be explained by the standard documents.

The following technology may be employed for a variety of wireless access systems, for example, a code division multiple access (CDMA), a frequency division multiple access (FDMA), a time division multiple access (TDMA), an orthogonal frequency division multiple access (OFDMA), and a single carrier frequency division multiple access (SC-FDMA). The CDMA may be embodied using a wireless technology such as a universal terrestrial radio access (UTRA) or CDMA 2000. The TDMA may be embodied using a wireless technology such as a global system for mobile communications (GSM)/general packet radio service (GPRS)/enhanced data rates for GSM evolution (EDGE). The OFDMA may be embodied using a wireless technology such as IEEE 802.11 (Wi-Fi), IEEE 802.16 (WiMAX), IEEE 802-20, and evolved UTRA (E-UTRA). For clarity and conciseness, description is made generally based on an IEEE 802.11 system, however, the technical spirit of the present invention is not limited thereto or restricted thereby.

FIG. 1 is a diagram illustrating an example of an interference environment of a wireless local area network (WLAN) system according to an embodiment.

A WLAN system may include at least one basic service set (BSS). The BSS may be provided in an access point (AP) and at least one of user terminals.

The AP is a functional entity to provide an access to a distribution system via wireless entities for a user terminal associated with an AP. The AP may communicate with at least one user terminal at a predetermined point through a downlink and an uplink. The downlink is a communication link from the AP to the user terminal, and the uplink is a communication link from the user terminal to the AP. The user terminal may perform peer-to-peer (P2P) communication with another user terminal.

Communication between the user terminals via an AP is a principle of a BSS including the AP. However, when a direct link is set between the user terminals, the user terminals may directly perform communication without via AP. For example, the AP refers to as a central controller, a base station (BS), a node-B, or a based transceiver system (BTS) and the AP may be realized by way of the foregoing.

The user terminal refers to as a mobile terminal, a wireless device, a wireless transmit and receive unit (WTRU), a user equipment (UE), a mobile station (MS), a mobile subscriber unit, or, simply, a user. The AP may be realized by way of the foregoing.

The AP may simultaneously transmit data to a user terminal group including at least one user terminal among a plurality of user terminals associated with the AP.

The WLAN system supports multi-user multiple-input multiple-output (MU-MIMO) communication. In the MU-MIMO communication system, the AP may transmit a number of space streams to the plurality of user terminals using multiple antennas. In addition, when the AP uses a number of receiving antennas, the AP may transmit data frames to the user terminals based on beamforming technology to enhance transmission performance. The interference environment in the WLAN system may be assumed to be as illustrated in FIG. 1. An environment in which multiple antennas are included in each AP and at least one antenna is included in a plurality of user terminals wirelessly connected to each AP may be assumed.

The plurality of user terminals is able to be connected to networks of each AP, and each of the user terminals may perform communication via an AP network to which the user terminals belong. In such an interference environment, each of the user terminals may perform precoding by using the multiple antennas in a message symbol transmitting process in order to reduce an interference effect by another AP network.

When a user terminal transmits a signal to the AP network to which corresponding user terminal belongs in a wireless interference channel environment, a signal received by the AP may be modeled as shown in Equation 1.

$$r_g = H^g_{\Phi_g} V_{\Phi_g} S_{\Phi_g} + \sum_{x \neq g}^{K} H^g_{\Phi_x} V_{\Phi_x} S_{\Phi_x} + n_g \qquad [\text{Equation 1}]$$

In Equation 1, $r_g$ denotes a signal vector received from an AP g, and $H^g_{\Phi_x}$ denotes a wireless channel matrix between an AP c and a user terminal $\Phi_x$. $V_{\Phi_x}$ denotes a transmission signal vector of the user terminal $\Phi_x$, and $S_{\Phi_x}$ denotes message symbol of the user terminal $\Phi_x$. Here, the user terminal $\Phi_x$ indicates a user terminal obtaining a transmission opportunity in a network of an AP x. $n_g$ denotes a noise vector in the AP g, and K denotes a number of APs.

Hereinafter, an opportunistic interference alignment (OIA) method will be described. When message symbols are simitaneosly transmitted from a plurality of interference environment AP networks, a throughput of entire network may decrease due to an interference phenomenon. Thus, to prevent the decrease in the throughput of the network due to the interference phenomenon, interference coordination may be needed.

The AP may designate a subspace to be received by the corresponding AP, and broadcast information on the designated subspace. Subsequently, a user terminal may measure channels between the corresponding user terminal and each AP, minimize an interference effect on another BSS based on the information on the subspace received from the AP, and determine a transmission power term and a transmission vector to transmit a signal greater than or equal to a predetermined level, to the AP of a BSS to which the corresponding user terminal belongs. When the user terminal transmits a signal using the optimized transmission vector and the transmission power term, the user terminal may calculate a leakage of interference (LIF) which is the interference effect affecting another BSS and transmit the calculated LIF information to the AP. The AP may select a user terminal having a lowest LIF level, that is, a user terminal affecting a most modest interference effect based on the received LIF information, and broadcast information on the selected user terminal. Subsequently, the user terminals selected in each BSS may transmit a data packet to the AP of the BSS to which the corresponding user terminal belongs, based on an optimized beamforming vector and the transmission power term.

In a case of a communication method using OIA, each AP may select a user terminal having a most modest interference effect on another AP network and communicate with the selected user terminal, whereby a decrease in the throughput caused by interference may be prevented. In the OIA, an AP may designate a signal space to be decoded for each AP network. Thus, user terminals may measure LIF levels that may affect another network. In this example, an LIF level of each user terminal may be determined as shown in Equation 2. An LIF may include information on interference by another user terminal within a service area of the AP and information on interference by another AP.

$$\text{for } a \in \Omega_g, LIF_a = \sum_{x \neq g}^{K} |w_x^H H_a^x v_a|^2 \quad \text{[Equation 2]}$$

In Equation 2, $LIF_a$ denotes an LIF with respect to a user terminal a, and $\Omega_g$ denotes a set of user terminals belonging to an AP network g. K denotes a number of APs, and $w_x^H$ denotes a receiving vector with respect to a channel matrix H of an AP x. $H_a^x$ denotes a wireless channel matrix between the AP x and the user terminal a, and $V_a$ denotes a transmission vector. Here, the user terminal may adjust $V_a$ corresponding to the transmission vector to be transmitted and minimize LIF levels available to each user terminal.

In the communication method based on the OIA, the user terminal having the lowest LIF level may minimize the interference effect among each AP network by obtaining a message symbol transmission opportunity.

Figure 2:
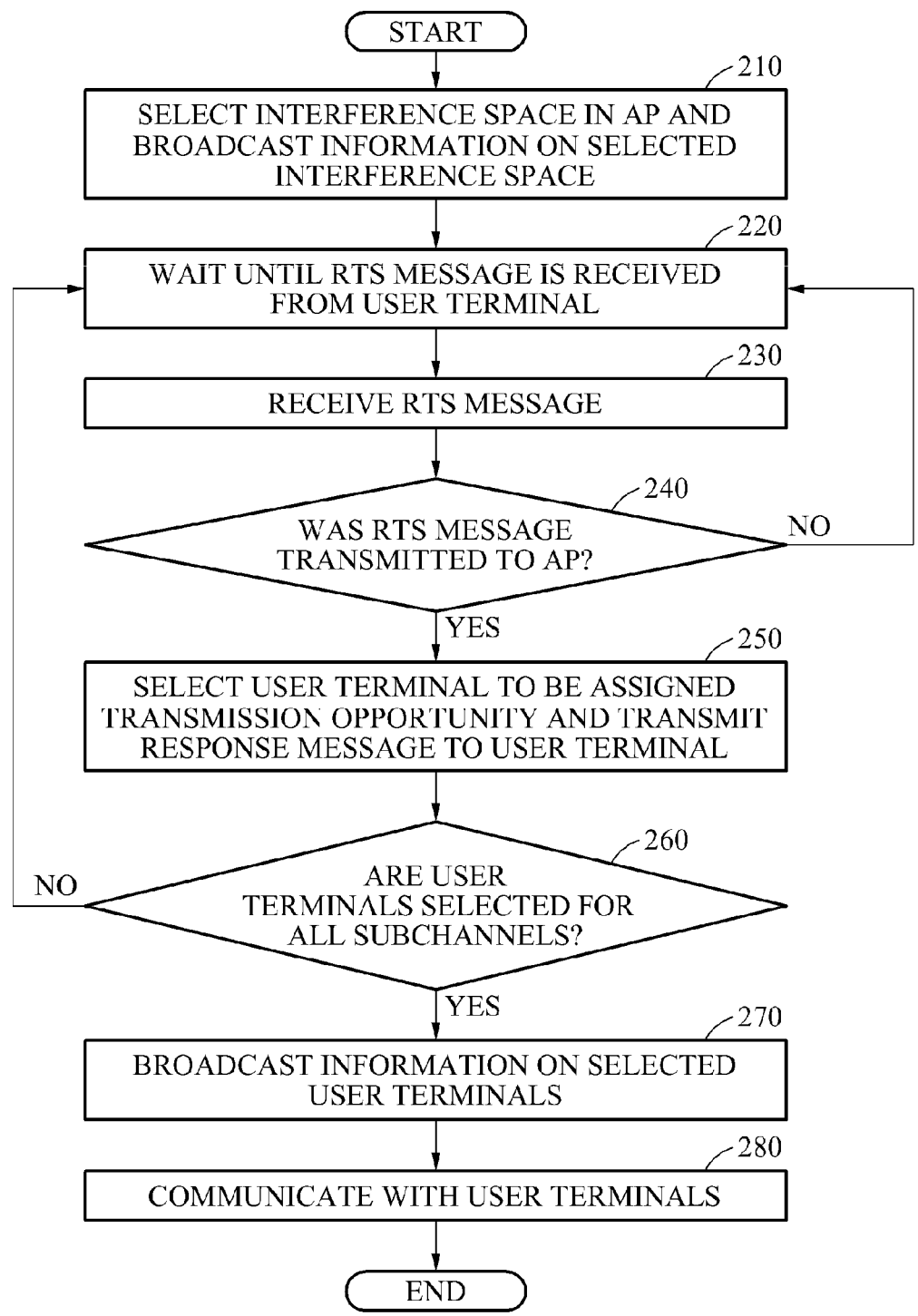
FIG. 2 is a flowchart illustrating an interference alignment (IA) method performed by an access point (AP) according to an embodiment.

FIG. 2 is a flowchart illustrating an interference alignment (IA) method performed by an access point (AP) according to an embodiment.

In operation 210, the AP selects an interference space and broadcasts information on the selected interference space. Here, the AP may broadcast the information on the interference space with respect to all user terminals in an AP network. The AP determines a transmission vector to be transmitted to a user terminal based on a channel between the AP and the at least one user terminal. In an example, an AP may determine a transmission vector based on a signal to interference plus noise ratio (SINR) of a signal received from at least one user terminal. In another example, an AP may calculate a Lagrangian multiplier, calculate a null vector based on a Lagrangian function, and determine a transmission vector based on the null vector.

In operation 220, the AP waits until a request to send (RTS) message with respect to a predetermined subchannel is received from the at least one user terminal.

In operation 230, the AP receives the RTS message from the at least one user terminal.

In operation 240, when the RTS message is received, the AP may verify whether the received RTS message was transmitted to the AP. The AP may verify whether the RTS message is transmitted though a subchannel assigned to the AP. When the RTS message does not belong to the AP, the AP may not allow a user terminal having transmitted the RTS message to be connected to the AP, and may return to operation 220 and wait until an RTS message is received.

In operation 250, when the received RTS message is transmitted to the AP, the AP may select a user terminal to be assigned a transmission opportunity for the corresponding subchannel and transmit a response message to the user terminal. When an RTS message including LIF information is received from at least one user terminal, the AP may select a user terminal to be assigned a transmission opportunity for each subchannel based on the LIF information. The AP may select a user terminal having a lowest LIF level as the user terminal to be assigned the transmission opportunity.

In an example, an AP may assign a transmission opportunity for a corresponding subchannel to a user terminal transmitting an RTS message. When the RTS message is received, the AP may transmit an acknowledgement (ACK) message or a clear to send (STS) message corresponding to the received RTS message to the user terminal transmitting the RTS message.

In operation 260, the AP verifies whether the user terminals are selected for all subchannels. When user terminals are not selected for all subchannels, the AP may return to operation 220 in order to select a user terminal for a subchannel in which a user terminal is not selected, and wait until an RTS message for another subchannel is received. The AP may perform operations 220 through 250 with respect to all subchannels of the AP.

When user terminals are selected for all subchannels, the AP may broadcast information on the user terminals selected for the respective subchannels of the AP in operation 270. In an example, a message to be broadcast may indicate that a message negotiation is terminated. The AP may broadcast the message to the user terminals connected to the respective subchannels. In this example, the message may include information on the user terminals selected for the respective subchannels. For example, the message may include information regarding which user terminal is connected to which subchannel, and information including physical or logical addresses of the user terminals.

The AP may receive an RTS message for each subchannel and broadcast information on the selected user terminals after an RTS message negotiation for all of the subchannels is completed, thereby simultaneously informing all of the user terminals that the message negotiation for all of the subchannels is completed and that a communication phase is initiated.

When the connections between the AP and the user terminals are completed, the AP may communicate with the user terminals, and transmit a message symbol to the user terminals in operation 280. The AP may communicate with a user terminal selected for a predetermined subchannel. The AP may transmit data to the user terminals selected for the respective subchannels.

Figure 3:
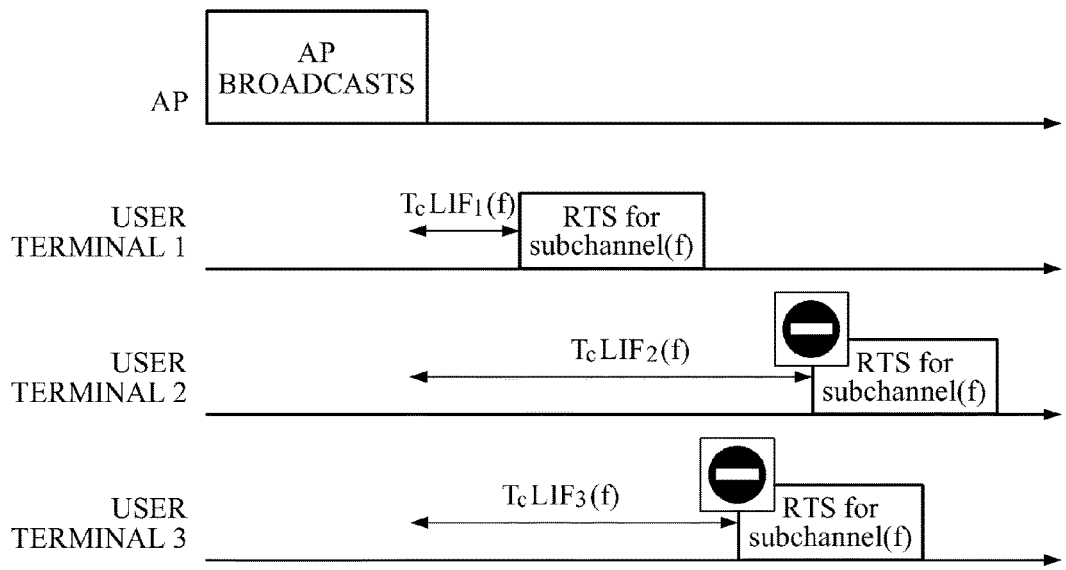
FIG. 3 is a diagram illustrating a method of receiving a request to send (RTS) message for a predetermined subchannel by an AP according to an embodiment.

FIG. 3 is a diagram illustrating a method of receiving a request to send (RTS) message for a predetermined subchannel by an AP according to an embodiment.

The AP may adjust a period of time during which a user terminal waits to transmit a control message, referred to as a waiting time, to be proportional to an LIF level. For example, when an LIF level for a subchannel f of a user terminal a is denoted by $LIF_a(f)$, the AP may determine a waiting time during which the user terminal a waits to transmit an RTS message for the subchannel f to be $T_c LIF_a(f)$. In this example, $T_c$ is a preset constant.

When other user terminals belonging to the same network do not transmit RTS messages for the subchannel f during $T_c LIF_a(f)$, the user terminal a may transmit an RTS message for the subchannel f to the AP. The AP may transmit an ACK message or a CTS message for the corresponding subchannel in response to a reception of the RTS message for the subchannel f. When an RTS message, an ACK message, or a CTS message is received, the other user terminals belonging to the same network may not transmit RTS messages for the corresponding subchannel during communication between the AP and the user terminal a. The CTS message or the ACK message may include a field configured to transfer a wireless resource block and AP address information.

Each user terminal may set a waiting time during which the corresponding user terminal waits until an RTS message for each subchannel is transmitted, to be proportional to an LIF level.

When a user terminal transmits an RTS message first in a subchannel, the AP may estimate that the user terminal has a lowest LIF level. Thus, when one of user terminals belonging to the same network transmits an RTS message for the subchannel f, the AP may control the other user terminals not to additionally transmit RTS messages for the subchannel f to the AP.

Figure 4:
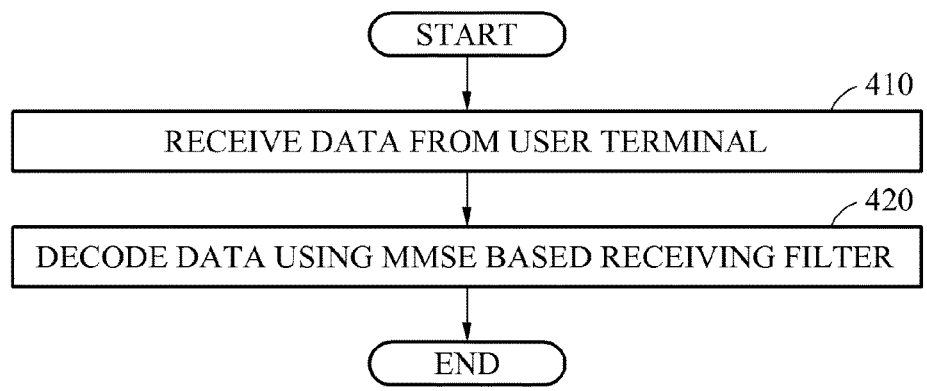
FIG. 4 is a flowchart illustrating a method of decoding a packet using a minimum mean square error (MMSE) based receiving filter by an AP according to an embodiment.

FIG. 4 is a flowchart illustrating a method of decoding a packet using a minimum mean square error (MMSE) based receiving filter by an AP according to an embodiment.

In operation 410, the AP receives data from a user terminal. The AP may receive a data packet from user terminals belonging to a BSS of the AP.

In operation 420, the AP decodes the data received from the user terminal using an MMSE based receiving filter. The AP may determine the MMSE based receiving filter based on an interference effect among BSSs.

For example, an AP may determine a receiving filter to be used in a decoding process of data as shown in Equation 3.

$$u_g = \left( I_L + \sum_{\substack{k=1 \\ k \neq g}}^{K} p_{k,\phi_k} H_{k,\phi_k}^g v_{k,\phi_k} (H_{k,\phi_k}^g v_{k,\phi_k})^H \right)^{-1} \sqrt{p_{g,\phi_g}} H_{g,\phi_g}^g v_{g,\phi_g}$$
[Equation 3]

In Equation 3, $u_g$ denotes a receiving vector in an AP g. A first element $$\left( I_L + \sum_{\substack{k=1 \\ k \neq g}}^{K} p_{k,\phi_k} H_{k,\phi_k}^g v_{k,\phi_k} (H_{k,\phi_k}^g v_{k,\phi_k})^H \right)^{-1}$$

performs a function of reducing noise and interference included in data based on a noise variance and effect on interference among BSSs. Accordingly, an interference effect may be measured in order to determine the MMSE based receiving filter, so that an additional pilot carrier to measure the interference among the BSSs needs to be provided within an existing WLAN frame. A configuration of the WLAN frame including the additional pilot carrier will be provided with reference to FIG. 5.

In Equation 3, a second element $\sqrt{p_{g,\phi_g}} H_{g,\phi_g}^g v_{g,\phi_g}$ performs a function of a matched filter and a function of increasing a signal transmission gain.

The AP may determine a final receiving vector by multiplying the first element $$\left( I_L + \sum_{\substack{k=1 \\ k \neq g}}^{K} p_{k,\phi_k} H_{k,\phi_k}^g v_{k,\phi_k} (H_{k,\phi_k}^g v_{k,\phi_k})^H \right)^{-1}$$

and the second element $\sqrt{p_{g,\phi_g}} H_{g,\phi_g}^g v_{g,\phi_g}$.

The AP may minimize an effect of the interference and noise in an interference environment by decoding the data using the MMSE based receiving filter determined based on Equation 3.

Figure 5:
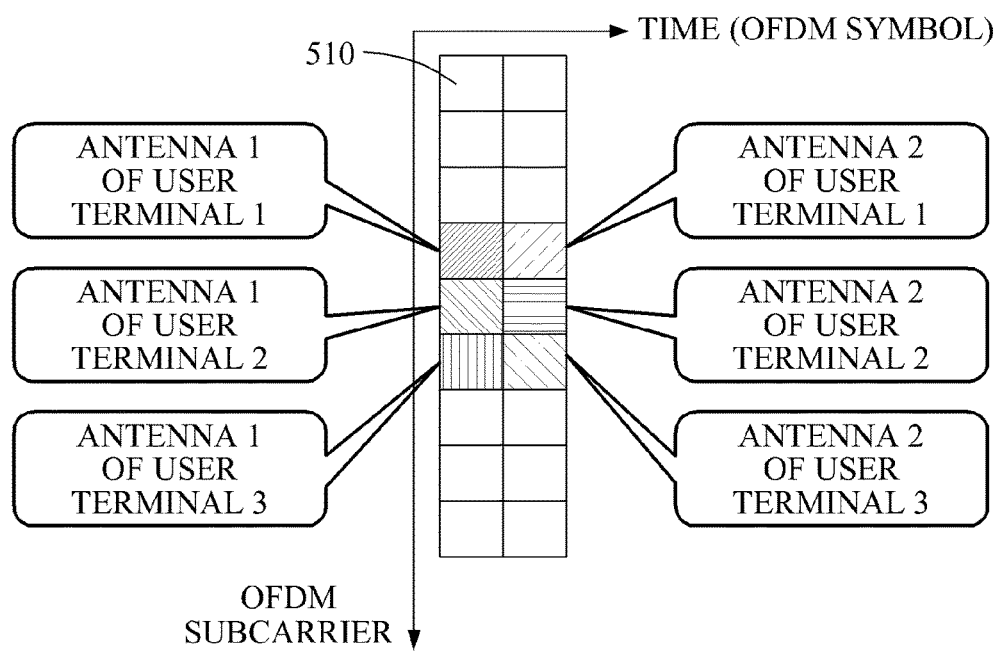
FIG. 5 is a diagram illustrating an example of a WLAN frame structure for MMSE based decoding according to an embodiment.

FIG. 5 is a diagram illustrating an example of a WLAN frame structure for MMSE based decoding according to an embodiment.

FIG. 5 illustrates an example of a pilot structure for an MMSE based receiving filter. An interference environment from different BSSs needs to be accurately measured in order to perform the MMSE based decoding in each AP. An existing WLAN frame includes a plurality of data carriers 510, and pilots for measuring interference among each of BSSs may be added to a structure of the existing WLAN frame. The added pilots may have a structure of being orthogonally used among the BSSs in lieu of being shared among the BSSs. The added pilots to the WLAN frame may be independently used among the BSSs.

User terminals included in different BSSs may use different pilots, and the AP may accurately measure interference effect and communication channel information corresponding to a desired signal, based on the pilot structure illustrated in FIG. 5. In response to an increase in a number of BSSs affecting interference effect to each other, a number of the pilots may also increase according to the number of the BSSs. Accordingly, a relationship between a throughput and a pilot overhead may be considered to obtain an optimal WLAN throughput performance.

Figure 6:
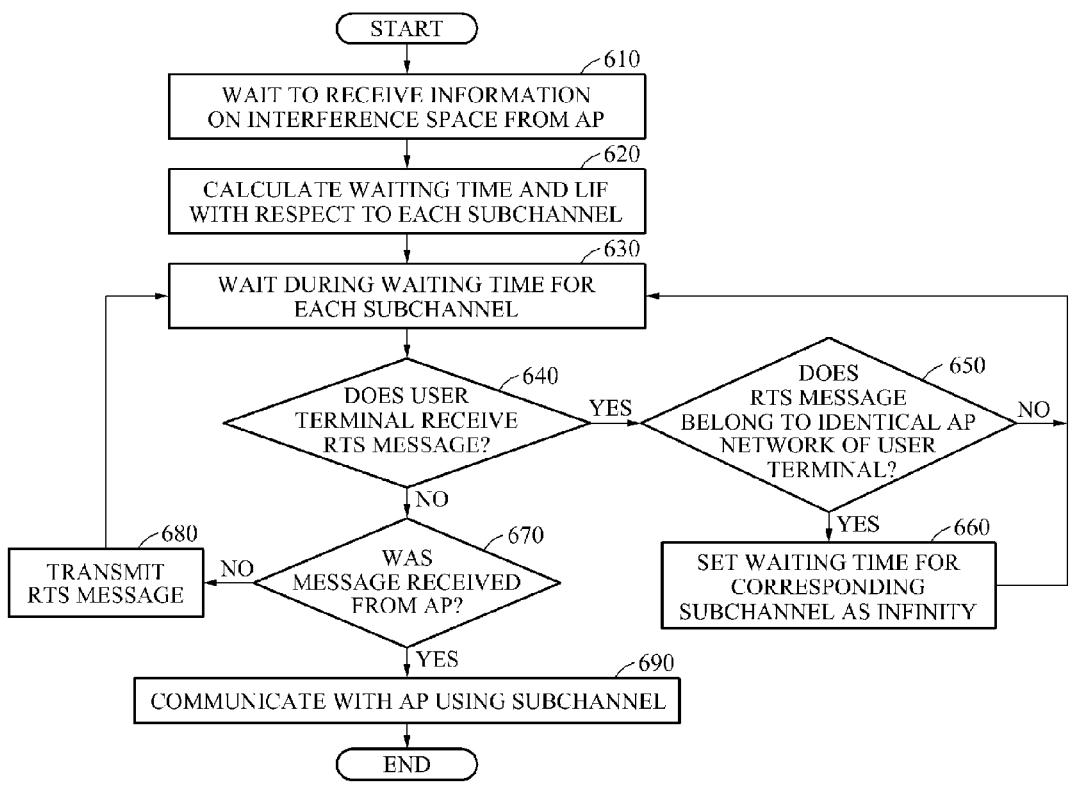
FIG. 6 is a flowchart illustrating an IA method performed by a user terminal according to an embodiment.

FIG. 6 is a flowchart illustrating an IA method performed by a user terminal according to an embodiment.

In operation 610, the user terminal waits to receive information on an interference space from an AP.

In operation 620, the user terminal calculates a waiting time to transmit an RTS message and LIF with respect to each subchannel when the information on the interference space is received from the AP. The user terminal may determine the LIF for each subchannel based on the information on the interference space received from the AP. Here, the LIF may be determined based on Equation 2. The user terminal may determine the waiting time to transmit the RTS message based on the determined LIF. For example, a user terminal sets a waiting time to be proportional to an LIF level.

In operation 630, the user terminal waits to transmit the RTS message during the waiting time for each subchannel. In an example, the user terminal may wait during a waiting time after information on an interference space selected by the AP is received from the AP.

When the waiting time elapses, the user terminal may transmit the RTS message to the AP. The user terminal may transmit the RTS message to the AP based on a state of a subchannel through which the RTS message is to be transmitted, rather than based on the waiting time.

In operation 640, the user terminal may verify whether the RTS message is received from another user terminal. When the user terminal receives the RTS message transmitted from another user terminal, the user terminal may verify whether the received RTS message belongs to an identical AP network to a current AP network of the user terminal in operation 650.

When the received RTS message is received from another user terminal belonging to the identical AP network to the current AP network of the user terminal, the user terminal may set the waiting time for the corresponding subchannel as infinity in operation 660. When the user terminal receives the RTS message from another user terminal during the waiting time, the user terminal may reset the waiting time as infinity to assign a priority to communicate with the AP to a user terminal having transmitted the RTS message first.

In another example, when a message indicating that the AP received an RTS message from at least one user terminal is received from the AP during a waiting time, the user terminal may reset the waiting time as infinity.

When the user terminal does not receive the RTS message transmitted from another user terminal in operation 640, the user terminal may verify whether a broadcast message was received from the AP in operation 670. The broadcast message refers to a message indicating that a message negotiation with respect to the corresponding AP is terminated.

When the broadcast message is not received from the AP, the user terminal may transmit the RTS message for the corresponding subchannel to the AP in operation 680. The RTS message may include information on an LIF level for each subchannel. The user terminal may transmit the RTS message to the AP when feedback information is not received from another user terminal within a service range of the AP during the waiting time. Operation 680 may be performed after the waiting time determined based on the LIF level elapses.

As described above, when the waiting time elapses, the user terminal may transmit the RTS message to the AP. In this example, when the user terminal receives the RTS message for the corresponding subchannel from another terminal before the waiting time elapses, whether the other user terminal having transmitted the RTS message belongs to a network of the user terminal may be verified. When the other user terminal belongs to the network of the user terminal, the user terminal may not transmit the RTS message for the corresponding subchannel to the AP.

After the user terminal transmits the RTS message, the user terminal may wait until an ACK message or a CTS message is received from the AP.

In operation 690, the user terminal may communicate with the AP 710 using the subchannel though which the RTS message was transmitted. The user terminal may transmit a message symbol to the AP.

Figure 7:
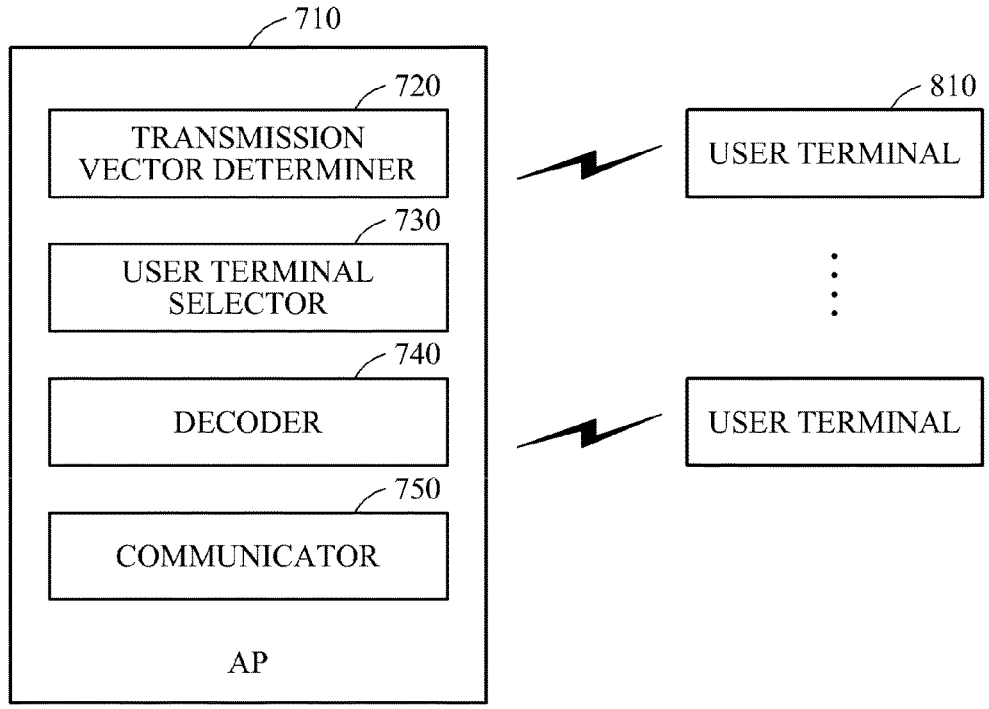
FIG. 7 is a diagram illustrating a configuration of an AP according to an embodiment.

FIG. 7 is a diagram illustrating a configuration of an AP 710 according to an embodiment.

Referring to FIG. 7, the AP 710 includes a transmission vector determiner 720, a user terminal selector 730, a decoder 740, and a communicator 750.

The transmission vector determiner 720 may select an interference space to be used by user terminals 810. The transmission vector determiner 720 may determine a transmission vector to be transmitted to the user terminals 810 based on a channel between the AP 710 and at least one user terminal 810 and a channel among APs affected by an interference effect. The transmission vector determiner 720 may minimize an LIF level using a transmission vector based on a channel state between the AP 710 and the at least one user terminal 810.

The transmission vector determiner 720 may determine a transmission power and a beam vector based on a precoding scheme using a Lagrangian based optimization. The transmission vector determiner 720 may calculate a Lagrangian multiplier, calculate a null vector based on a Lagrangian function, and determine the transmission vector based on the null vector.

TABLE 1

Algorithm $1^{st}$ step: Lagrangian multiplier calculation $$\frac{1}{\lambda} = \text{Trace}\left[\left(\sum_{k=g}^{K} (H_a^k)^H w_k w_k^H H_a^k\right)^{-1} (H_a^g)^H w_g w_g^H H_a^g\right]$$

$2^{nd}$ step: transmission vector space decision
$v_a$ = linearly scaled version of null vector of TABLE 1-continued Algorithm $$\left[\left(\sum_{k=g}^{K} (H_a^k)^H w_k w_k^H H_a^k\right) - \lambda (H_a^g)^H w_g w_g^H H_a^g\right]$$

$3^{rd}$ step: transmission vector scaling with constraint
$|w_g^H H_a^g v_a|^2 = \text{SNR}$ Table 1 is included from an issue of Lagrangian optimization to define a Lagrangian function and express a method of calculating a vector satisfying conditions.

The including process of Table 1 is as follows. The optimization issue for Lagrangian optimization may be expressed by Equation 4.

For $a \in$ cell $g$ [Equation 4]

$$\text{minimize } LIF_a = \sum_{k \neq g}^{K} |w_k^H H_a^k v_a|^2$$

Constraint $|w_g^H H_a^g v_a|^2 = SNR$

In Equation 4, $LIF_a$ denotes an LIF with respect to a user terminal a. $w_k^H$ denotes a receiving vector with respect to a channel matrix H of an AP k, and $w_k^H$ denotes a receiving vector with respect to the channel matrix H of an AP g. $H_a^k$ denotes a channel matrix between the AP k and the user terminal a, and $H_a^g$ denotes a channel matrix between the AP g and the user terminal a. $v_a$ a denotes a transmission vector and SNR denotes a signal to noise ratio (SNR).

The Lagrangian function to resolve the issue of Equation 4 may be defined as expressed by Equation 5.

$$L(v_a, \lambda) = \sum_{k \neq g}^{K} |w_k^H H_a^k v_a|^2 - \lambda(SNR - |w_g^H H_a^g v_a|^2)$$ [Equation 5]

$$= (v_a)^H \left(\sum_{k \neq g}^{K} (H_a^k)^H w_g w_k^H H_a^k\right) v_a +$$

$$\lambda(SNR - (v_a)^H (H_a^g)^H w_g w_g^H H_a^g v_a)$$

In Equation 5, $\lambda$ denotes a result value calculated in a $1^{st}$ step in Table 1. $w_k$ denotes a receiving vector of the AP k, $w_g$ denotes a receiving vector of the AP g.

To obtain an optimized receiving vector in Equation 5, conditions of Equation 6 need to be satisfied.

$$\frac{\partial L(v_a, \lambda)}{\partial v_a} = 0, |w_g^H H_a^g v_a|^2 = SNR, \text{ positive } \lambda \text{ exists.}$$ [Equation 6]

A first condition may be arranged as expressed by Equation 7.

$$\frac{\partial L(v_a, \lambda)}{\partial v_a} = \left(\sum_{k \neq g}^{K} (H_a^k)^H w_k w_k^H H_a^k\right) v_a - \lambda (H_a^g)^H w_g w_g^H H_a^g v_a =$$ [Equation 7]

$$\left[\left(\sum_{k\neq g}^{K}(H_a^k)^H w_k w_k^H H_a^k\right) - \lambda(H_a^g)^H w_g w_g^H H_a^g\right]v_a = 0$$

To satisfy the condition of Equation 7, a determinant of $$\left[\left(\sum_{k\neq g}^{K}(H_a^k)^H w_k w_k^H H_a^k\right) - \lambda(H_a^g)^H w_g w_g^H H_a^g\right]$$

is necessarily to be "0". When the determinant corresponds to "0", a null vector may exist. The null vector may be provided as a vector space that minimizes an LIF.

A Lagrangian multiplier that makes the determinant of $$\left[\left(\sum_{k\neq g}^{K}(H_a^k)^H w_k w_k^H H_a^k\right) - \lambda(H_a^g)^H w_g w_g^H H_a^g\right]$$

to be "0" may be modified as an eigenvalue problem for calculation. When a number of APs is greater than a number of antennas of an AP, a covariance matrix $$\left(\sum_{k\neq g}^{K}(H_a^k)^H w_k w_k^H H_a^k\right)$$

of colored noise may be provided as a square matrix having a full rank. Thus, an inverse matrix of $$\left(\sum_{k\neq g}^{K}(H_a^k)^H w_k w_k^H H_a^k\right)$$

may exist, and a determinant condition may be modified as expressed by Equation 8.

$$\det\left[1 - \lambda\left(\sum_{k\neq g}^{K}(H_a^k)^H g_k g_k^H H_a^k\right)^{-1}(H_a^g)^H g_g g_g^H H_a^g\right] = \quad \text{[Equation 8]}$$

$$0 \rightarrow \det\left[\left(\sum_{k\neq g}^{K}(H_a^k)^H g_k g_k^H H_a^k\right)^{-1}(H_a^g)^H g_g g_g^H H_a^g - \frac{1}{\lambda}I\right] = 0$$

Accordingly, in a case of the Lagrangian multiplier, the determinant condition may be provided in an inverse form of a positive eigenvalue of $$\left(\sum_{k\neq g}^{K}(H_a^k)^H w_k w_k^H H_a^k\right)^{-1}(H_a^g)^H w_g w_g^H H_a^g.$$

The positive eigenvalue may be expressed in a form of $$\text{Trace}\left[\left(\sum_{k\neq g}^{K}(H_a^k)^H w_k w_k^H H_a^k\right)^{-1}(H_a^g)^H w_g w_g^H H_a^g\right],$$

for example, a sum of diagonal terms.

In the above matrix, a rank of a $(H_a^g)^H w_g w_g^H H_a^g$ term may be given as "1". Thus, a rank of $$\left(\sum_{k\neq g}^{K}(H_a^k)^H w_k w_k^H H_a^k\right)^{-1}(H_a^g)^H w_g w_g^H H_a^g$$

may also be less than or equal to "1", which indicates that a number of positive eigenvalues is less than or equal to "1" and a number of remaining eigenvalues corresponds to "0" among all eigenvalues. Thus, it may be intuitively understood that a sum of all eigenvalues corresponds to the sole positive eigenvalue. The sum of the eigenvalues may be obtained using a trace of the matrix, for example, a sum of the diagonal terms. Thus, it may be understood that the sole positive eigenvalue corresponds to $$\text{Trace}\left[\left(\sum_{k\neq g}^{K}(H_a^k)^H w_k w_k^H H_a^k\right)^{-1}(H_a^g)^H w_g w_g^H H_a^g\right].$$

After the Lagrangian multiplier is calculated, a null vector in a differential form of the aforementioned Lagrangian function may be calculated based on Equation 9.

$$\left[\left(\sum_{k\neq g}^{K}(H_a^k)^H w_k w_k^H H_a^k\right) - \lambda(H_a^g)^H w_g w_g^H H_a^g\right]v_a = 0 \quad \text{[Equation 9]}$$

The null vector calculated based on Equation 9 may be provided as the vector space that minimizes the LIF, and the transmission vector may be ultimately calculated based on SNR constraints.

The communicator 750 may broadcast information on the selected interference space. The communicator 750 may transmit the transmission vector determined by the transmission vector determiner 720 to the user terminals 810. The communicator 570 may receive an RTS message including LIF information from the at least one user terminal 810. The RTS message may be classified based on a subchannel.

When the RTS message including the LIF information is received from the at least one user terminal 810, the user terminal selector 730 may select the user terminals 810 to be assigned a transmission opportunity for each subchannel based on the LIF information. The user terminal selector 730 may select the user terminal 810 having a lowest LIF level as the user terminal 810 to be assigned the transmission opportunity.

The user terminal selector 730 may assign a transmission opportunity for a corresponding subchannel to the user terminal 810 having transmitted the RTS message. When the RTS message is received, the communicator 750 may transmit an ACK message or a CTS message corresponding to the received RTS message to the user terminal 810.

The user terminal selector 730 may verify whether the user terminals 810 are selected for all subchannels. When the user terminals 810 are not selected for all subchannels, the user terminal selector 730 may select the user terminals 810 based on an RTS message for another subchannel.

When the user terminals 810 are selected for all subchannels, the communicator 750 may broadcast information on the user terminals 810 selected for respective subchannel. In an example, a message to be broadcast may indicate that a message negotiation is terminated. The communicator 750 may broadcast the corresponding message to the user terminals 810 connected to the respective subchannels. In this example, the message may include information on the user terminals 810 selected for the respective subchannels. For example, the message may include information regarding which of the user terminals 810 is connected to a particular subchannel, and information including physical or logical addresses of the user terminals 810.

When the connections between the AP 710 and the user terminals 810 are completed, the communicator 750 may communicate with the user terminals 810, and transmit a message symbol to the user terminals 810. The communicator 750 may transmit data to the user terminals 810 selected for the respective subchannels.

When the communicator 750 receives the data from the user terminals 810, the decoder 740 may decode the data received from the user terminals 810 using an MMSE based receiving filter. For example, the decoder 740 may determine a receiving filter based on Equation 3, and decode the data using the determined the receiving filter. The receiving filter may include a first filter to reduce noise and interference included in the data and a second filter to perform a function of a matched filter to increase a signal transmission gain. The decoder 740 may minimize an effect of the interference and noise in an interference effect by decoding the data using the MMSE based receiving filter.

The user terminals 810 may transmit a WLAN frame in which pilots for measuring interference among BSSs are added to the AP 710, and the AP 710 may accurately estimate the interference among the BSSs by analyzing the pilots included in the WLAN frame.

Figure 8:
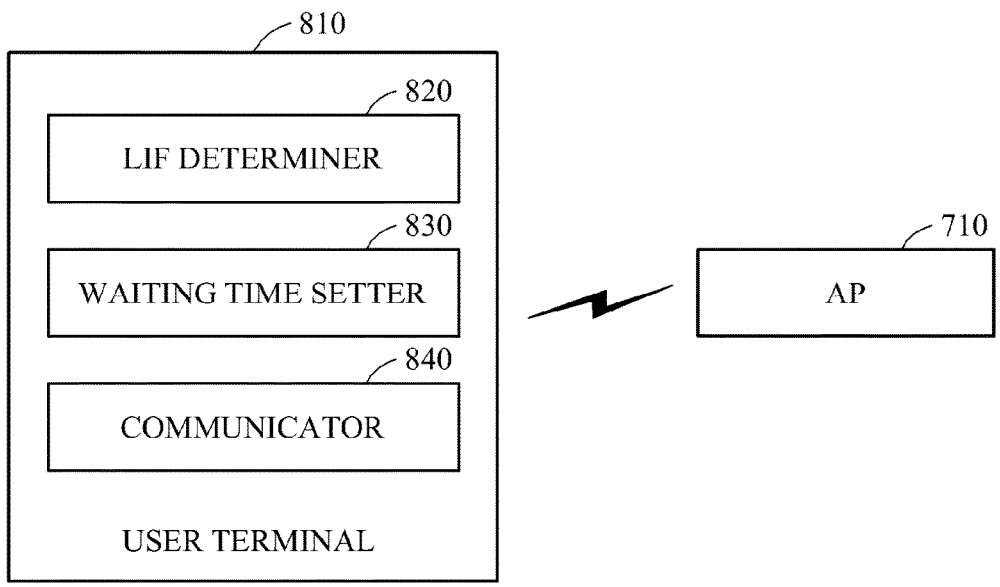
FIG. 8 is a diagram illustrating a configuration of a user terminal according to an embodiment.

FIG. 8 is a diagram illustrating a configuration of a user terminal 810 according to an embodiment.

Referring to FIG. 8, the user terminal 810 includes an LIF determiner 820, a waiting time setter 830, and a communicator 840.

The LIF determiner 820 may determine an LIF with respect to each subchannel when information on an interference space is received from the AP 710. The user terminal 810 may determine the LIF for each subchannel based on the information on the interference space received from the AP 710. The descriptions on Equation 2 are referred to with respect to a method of calculating an LIF.

The waiting time setter 830 may set a waiting time to transmit an RTS message based on the determined LIF. For example, the waiting time setter 830 sets a waiting time to be proportional to an LIF level.

The waiting time setter 830 may verify whether an RTS message is received from another user terminal. When the user terminal 810 receives the RTS message transmitted from another user terminal, the waiting time setter 830 may verify whether the received RTS message belongs to an identical AP network to a current AP 710 network of the user terminal 810. When the received RTS message is received from another user terminal belonging to the identical AP 710 network of the user terminal 710, the waiting time setter 830 may set the waiting time for the corresponding subchannel as infinity. The waiting time setter 830 may reset the waiting time as infinity when the RTS message is received from another user terminal during the waiting time.

In another example, when a message indicating that the AP 710 received an RTS message from at least one user terminal is received from the AP 710 during a waiting time, the waiting time setter 830 may reset the waiting time as infinity.

The communicator 840 may communicate with the AP 710 using a subchannel through which the RTS message was transmitted. The communicator 840 may transmit data to the AP 710. When feedback information is not received from another user terminal within a service range of the AP 710 during the waiting time, the communicator 840 may transmit the RTS message to the AP 710. The RTS message may include information on an LIF level for each subchannel.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An interference alignment (IA) method performed by an access point (AP), the method comprising:
    selecting an interference space;
    broadcasting information on the selected interference space;
    selecting a user terminal to be assigned a data transmission opportunity based on leakage of interference (LIF) information received from at least one user terminal;
    receiving data from the selected user terminal; and
    decoding the data using a minimum mean square error (MMSE) based receiving filter,
    wherein the at least one user terminal sets a waiting time to transmit a request to send (RTS) message based on a LIF that is determined based on information on interference space received from the AP, and transmits the RTS message to the AP when feedback information is not received from another user terminal within a service range of the AP during the waiting time, and
    wherein the waiting time is set to be proportional to an LIF level.

2. The method of claim 1, wherein the MMSE based receiving filter comprises a first filter to reduce noise and interference comprised in the data and a second filter to increase a signal transmission gain.

3. The method of claim 1, wherein the decoding of the data comprises determining the MMSE based receiving filter based on a wireless local area network (WLAN) frame in which pilots for measuring interference among different basic service sets (BSSs) are added.

4. The method of claim 3, wherein the pilots added to the WLAN frame are independently used among the BSSs.

5. The method of claim 1, wherein the selecting of the interference space comprises determining a transmission vector to be transmitted to the user terminal based on a channel between the AP and the at least one user terminal.

6. The method of claim 5, wherein the determining of the transmission vector comprises determining the transmission vector based on a signal-to-noise ratio (SNR) of a signal received from the at least one user terminal.

7. The method of claim 5, wherein the determining of the transmission vector comprises:
calculating a Lagrangian multiplier; and
calculating a null vector based on a Lagrangian function.

8. The method of claim 1, wherein the selecting of the user terminal comprises selecting a user terminal having a lowest LIF level as the user terminal to be assigned the data transmission opportunity.

9. The method of claim 1, further comprising:
broadcasting information on a user terminal selected for each subchannel when user terminals are selected for all subchannels.

10. An interference alignment (IA) method performed by a user terminal, the method comprising:
determining a leakage of interference (LIF) based on information on interference space received from an access point (AP);
setting a waiting time to transmit a request to send (RTS) message based on the determined LIF;
transmitting the RTS message to the AP when feedback information is not received from another user terminal within a service range of the AP during the waiting time;
transmitting information on the determined LIF to the AP; and
transmitting data to the AP when the AP assigns a data transmission opportunity, wherein the AP decodes the data received from the user terminal using a minimum mean square error (MMSE) based receiving filter, and
wherein the setting of the waiting time comprises setting the waiting time to be proportional to an LIF level.

11. The method of claim 10, wherein the MMSE based receiving filter comprises a first filter to reduce noise and interference comprised in the data and a second filter to increase a signal transmission gain.

12. The method of claim 10, wherein the AP determines the MMSE-based receiving filter based on a wireless local area network (WLAN) frame in which pilots for measuring interference among different basic service sets (BSSs) are added.

13. The method of claim 10, further comprising:
resetting the waiting time to infinity when an RTS message is received from the other user terminal during the waiting time.

14. The method of claim 10, further comprising:
resetting the waiting time to infinity when a message, indicating that the AP received an RTS message from at least one user terminal, is received from the AP during the waiting time.

15. An access point (AP), comprising:
a transmission vector determiner configured to determine a transmission vector based on a channel between the AP and at least one user terminal;
a user terminal selector configured to select a user terminal to be assigned a data transmission opportunity based on leakage of interference (LIF) information received from the at least one user terminal;
a communicator configured to receive data from the selected user terminal; and
a decoder configured to decode the data using a minimum mean square error (MMSE) based receiving filter,
wherein the at least one user terminal sets a waiting time to transmit a request to send (RTS) message based on a LIF that is determined based on information on interference space received from the AP, and transmits the RTS message to the AP when feedback information is not received from another user terminal within a service range of the AP during the waiting time, and
wherein the waiting time is set to be proportional to an LIF level.

16. The AP of claim 15, wherein the MMSE based receiving filter comprises a first filter to reduce noise and interference comprised in the data and a second filter to increase a signal transmission gain.

17. The AP of claim 15, wherein the decoder is configured to determine the MMSE based receiving filter based on a wireless local area network (WLAN) frame in which pilots for measuring interference among different basic service sets (BSSs) are added.

18. The AP of claim 15, wherein the user terminal selector is configured to select a user terminal having a lowest LIF level as the user terminal to be assigned the data transmission opportunity.

* * * * *